(12) United States Patent
Furbish et al.

(10) Patent No.: US 12,093,640 B2
(45) Date of Patent: Sep. 17, 2024

(54) OPTIMIZING QUESTIONS TO RETAIN ENGAGEMENT

(71) Applicant: Intuit Inc., Mountain View, CA (US)

(72) Inventors: Kevin Michael Furbish, Mountain View, CA (US); Glenn Carter Scott, Los Altos Hills, CA (US); Lalla Mouatadid, Ontario (CA)

(73) Assignee: Intuit Inc., Mountain View, CA (US)

( * ) Notice: Subject to any disclaimer, the term of this patent is extended or adjusted under 35 U.S.C. 154(b) by 379 days.

(21) Appl. No.: 17/489,659

(22) Filed: Sep. 29, 2021

(65) Prior Publication Data

US 2023/0097572 A1    Mar. 30, 2023

(51) Int. Cl.
    *G06F 40/174*      (2020.01)
    *G06F 40/289*      (2020.01)
    *G06N 20/20*      (2019.01)
    *H04L 67/50*      (2022.01)

(52) U.S. Cl.
    CPC .......... *G06F 40/174* (2020.01); *G06F 40/289* (2020.01); *G06N 20/20* (2019.01); *H04L 67/535* (2022.05)

(58) Field of Classification Search
    CPC .... G06F 40/174; G06F 40/289; G06F 3/0484; G06N 20/20; H04L 67/535; H04L 41/5064; G06Q 40/123
    See application file for complete search history.

(56) References Cited

U.S. PATENT DOCUMENTS

| | | | |
|---|---|---|---|
| 10,878,033 B2* | 12/2020 | Ahmed | G06F 16/9038 |
| 11,354,755 B2* | 6/2022 | Goldman | G06Q 40/123 |
| 11,538,049 B2* | 12/2022 | Gold | G06Q 30/0202 |
| 11,861,518 B2* | 1/2024 | Riddle | G06Q 10/0635 |
| 2017/0169345 A1* | 6/2017 | de Knijf | H04L 67/535 |
| 2019/0370833 A1* | 12/2019 | Gold | G06N 5/02 |
| 2020/0356237 A1* | 11/2020 | Moran | G06F 3/0481 |
| 2021/0233095 A9* | 7/2021 | Doherty | G06Q 30/0201 |
| 2021/0319375 A1* | 10/2021 | Noh | H04L 41/5064 |
| 2023/0032429 A1* | 2/2023 | Raj Susairaju | G06Q 10/06316 |
| 2023/0039338 A1* | 2/2023 | Udupa | G06F 3/0484 |

* cited by examiner

*Primary Examiner* — Richemond Dorvil
*Assistant Examiner* — Nadira Sultana
(74) *Attorney, Agent, or Firm* — Lathrop GPM LLP

(57) ABSTRACT

A method optimizes questions to retain engagement. The method includes generating, using a machine learning model, a churn risk from user interaction data. The method includes selecting, when the churn risk satisfies a threshold, a field, from multiple fields, using multiple prediction confidences corresponding to multiple prediction values generated for the multiple fields. The method includes obtaining a prediction value for the field and obtaining a question, corresponding to the field, using the prediction value. The method includes presenting the question and receiving a user input in response to the question.

13 Claims, 7 Drawing Sheets

FIGURE 4B

OPTIMIZING QUESTIONS TO RETAIN ENGAGEMENT

BACKGROUND

Interactive response systems (including interactive voice response (IVR) systems) interact with users to gather information from users and provide services based on the information gathered. For example, online tax preparation websites are interactive response systems that may gather tax information from users and fill out and file tax forms for users. With interactive response systems, a user may disengage from the system when the user gets bored, distracted, annoyed, etc., and feels like the system is no longer providing adequate service. A challenge for interactive response systems is to maintain engagement with users and automatically prevent disengagement.

SUMMARY

In general, in one or more aspects, the disclosure relates to a method that optimizes questions to retain engagement. The method includes generating, using a machine learning model, a churn risk from user interaction data. The method includes selecting, when the churn risk satisfies a threshold, a field, from multiple fields, using multiple prediction confidences corresponding to multiple prediction values generated for the multiple fields. The method includes obtaining a prediction value for the field and obtaining a question, corresponding to the field, using the prediction value. The method includes presenting the question and receiving a user input in response to the question.

A system includes a risk controller configured to generate a churn risk, a field controller configured to select a field, a question controller configured to obtain a question, and a server application that executes on one or more servers. The server application is configured for generating, using the risk controller using a machine learning model, the churn risk from user interaction data. The server application is configured for selecting, using the field controller when the churn risk satisfies a threshold, the field, from multiple fields, using multiple prediction confidences corresponding to multiple prediction values generated for the multiple fields. The server application is configured for obtaining a prediction value for the field and obtaining, using the question controller, the question, corresponding to the field, using the prediction value. The server application is configured for presenting the question and receiving a user input in response to the question.

A method includes presenting a question during a session of user interaction, selected in response to a churn risk generated by a server application. The server application is configured for generating, during the session and using a machine learning model, the churn risk from user interaction data. The server application is configured for selecting, when the churn risk satisfies a threshold, a field, from multiple fields, using multiple prediction confidences corresponding to multiple prediction values generated for the multiple fields. The server application is configured for obtaining a prediction value for the field, and obtaining a question, corresponding to the field, using the prediction value. The method includes transmitting a user input, received in response to the question and continuing the session, to the server application.

Other aspects of the invention will be apparent from the following description and the appended claims.

BRIEF DESCRIPTION OF DRAWINGS

FIG. 3, FIG. 4A, and FIG. 4B show examples in accordance with disclosed embodiments.

DETAILED DESCRIPTION

Figure 1A:
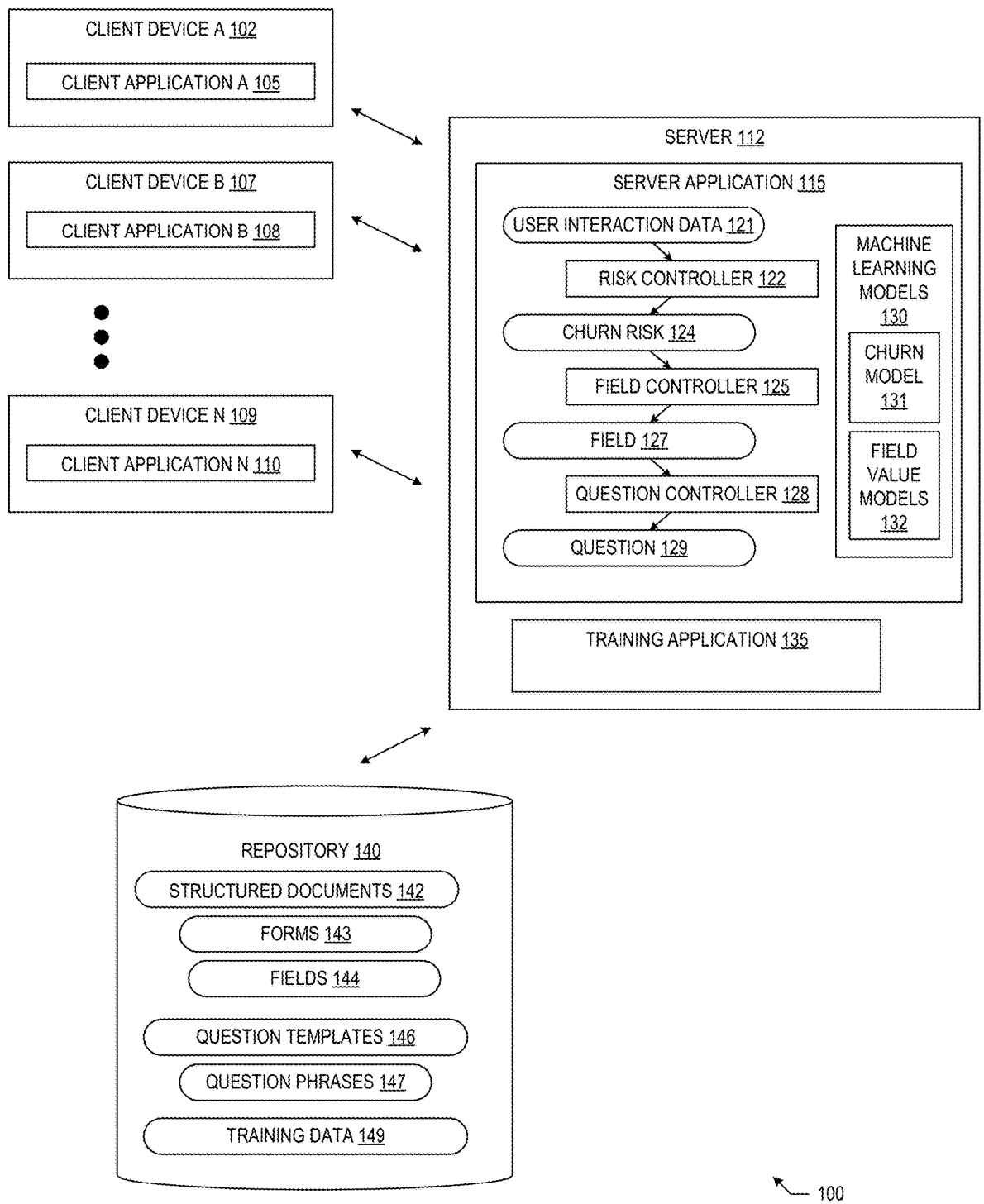
FIG. 1A, FIG. 1B, FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure maintain engagement with users of interactive response systems by optimizing questions to retain engagement. The questions are optimized by selecting questions for which the system has a relatively high confidence in predicting the response of the user.

When the churn risk (the risk that a user will disengage) is low, the system generates a question from the next field of an ordered set of fields. When the churn risk is high (i.e., the user may be about to disengage), the system predicts the values for the remaining fields (i.e., the unanswered questions), identifies a confidence for each of the predicted values, and selects the field with the highest confidence. A question is generated for the field with the highest confidence and presented to the user. By selecting fields and questions corresponding to high levels of confidence, instead of simply by the order of the fields, the system tailors the questions to the specific circumstance of the user to increase engagement and continue an interactive session with the user.

For example, if a system has three questions (or fields) remaining to be answered, the system may use the ordering of the questions to pick the next question to ask when the churn risk is low. When the churn risk is not low, the system may predict answers (i.e., values) for each of the questions (and corresponding fields) and predict confidences for each of the values. The question corresponding to the highest confidence may be selected and presented to the user.

Figure 1B:
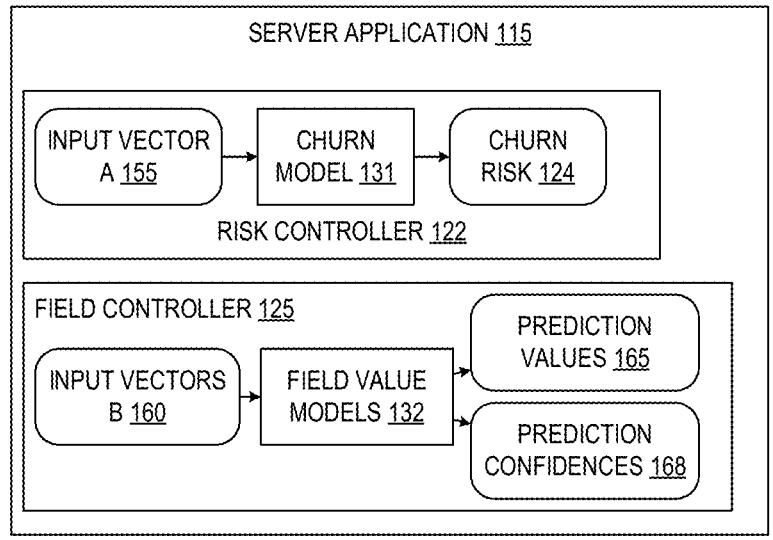
Figure 1C:
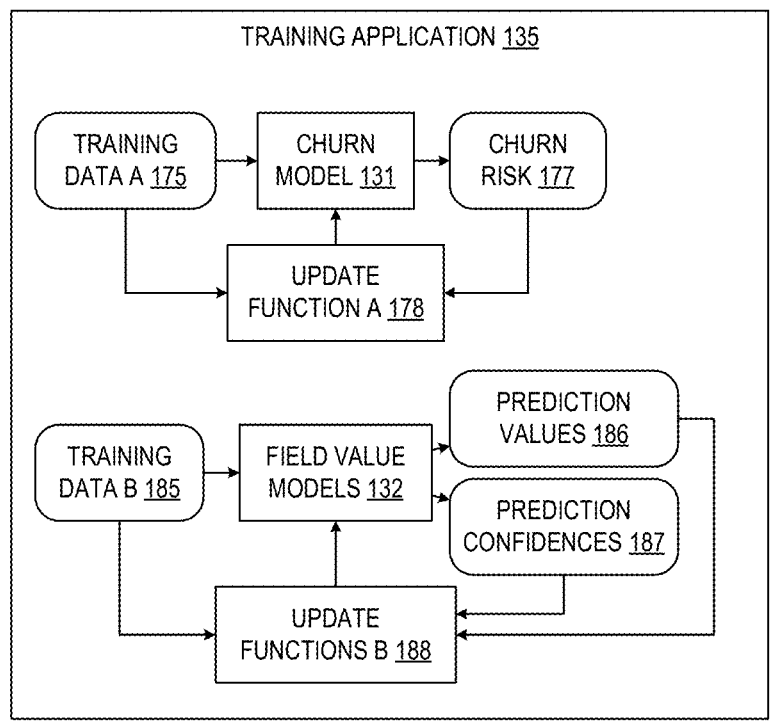

FIGS. 1A through 1C show diagrams of embodiments that are in accordance with the disclosure. FIG. 1A shows a diagram of the system (100) that optimizes questions to retain engagement with a user. FIG. 1B shows a diagram of the server application (115) that generates churn risks, prediction values, and prediction confidences using machine learning models. FIG. 1C shows a diagram of the training application (135) that trains machine learning models.

Embodiments of FIGS. 1A through 1C may be combined and may include or be included within the features and embodiments described in the other figures of the application. The features and elements of FIGS. 1A through 1C are, individually and as a combination, improvements to user response and machine learning technology and computing systems. The various elements, systems, and components shown in FIGS. 1A through 1C may be omitted, repeated, combined, and/or altered as shown from FIGS. 1A through 1C. Accordingly, the scope of the present disclosure should not be considered limited to the specific arrangements shown in FIGS. 1A through 1C.

Turning to FIG. 1A, the system (100) optimizes questions to retain engagement with one or more users. Users interact with the server (112) to fill out the fields (144) of the forms (143) using the client devices A (102) and B (107) through N (109). The system (100) is an interactive system that presents questions to users and receives responses during sessions between the server (112) and the client devices A (102) and B (107) through N (109). As an example, the system (100) may be used by the users to fill out tax forms by answering questions presented by the system (100). In one embodiment, the system (100) may be an interactive voice response (IVR) system and the questions may be answered with vocal utterances from the users that are converted into text. In one embodiment, the system (100) hosts a website, and the answers are provided with human input devices (mouses, keyboards, etc.). The system (100) includes the client devices A (102) through N (109), the server (112), and the repository (140).

Figure 5A:
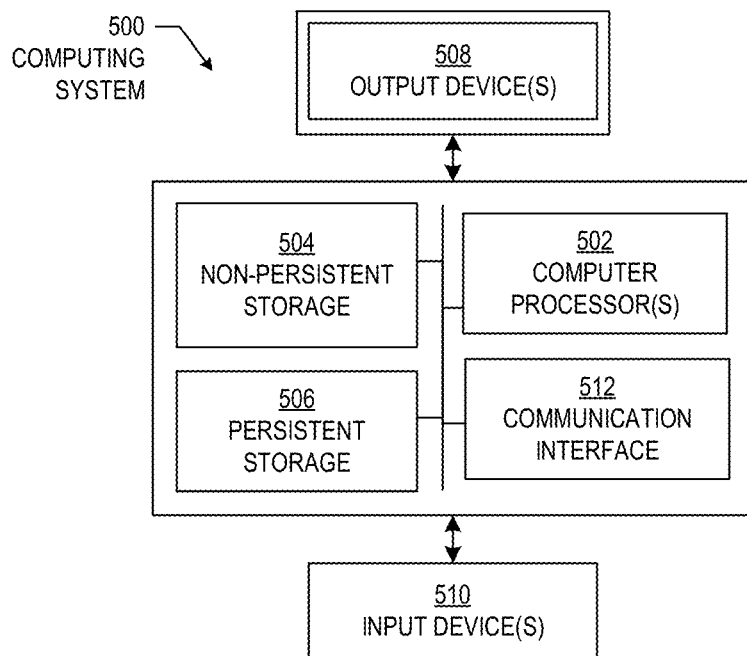
FIG. 5A and FIG. 5B show computing systems in accordance with disclosed embodiments.

The client devices A (102) and B (107) through N (109) are computing systems (further described in FIG. 5A). For example, the client devices A (102) and B (107) through N (109) may be desktop computers, mobile devices, laptop computers, tablet computers, etc. The client devices A (102) and B (107) through N (109) include hardware components and software components that operate as part of the system (100). The client devices A (102) and B (107) through N (109) communicate with the server (112) to display and manipulate the data stored in the repository (140) and control the machine learning models (130) used by the system (100). The client devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The client devices A (102) and B (107) through N (109) respectively include the client applications A (105) and B (108) through C (110).

The client applications A (105) and B (108) through C (110) may each include multiple programs respectively running on the client devices A (102) and B (107) through N (109). The client applications A (105) and B (108) through C (110) may be native applications, web applications, embedded applications, etc. In one embodiment the client applications A (105) and B (108) through C (110) include web browser programs that display web pages from the server (112).

In one embodiment, the client device A (102) may be used by a taxpayer to provide tax information for a tax form hosted by the server (112). The user of the client device A (102) may load a website hosted by the server (112). The website displays questions for the fields (144) for one of the forms (143). The user provides responses that include answers to the questions and the responses are sent to the server (112).

In one embodiment, the client device B (107) may be used by a tax preparer to prepare tax forms hosted by the server (112). The user of the client device B (107) may prepare and review a tax form (one of the forms (143)) populated with tax information from a taxpayer using the system (100).

The client device N (109) may be used by a developer to control the hardware and software components of the system (100). A developer using the client device N (109) may draft the question templates (146) and question phrases (147) for the fields (144) of the forms (143). In one embodiment, the developer using the client device N (109) may control the timing and training of the machine learning models (130) using the training application (135).

The server (112) is a computing system (further described in FIG. 5A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115) and the training application (135).

The server application (115) is a collection of programs that may execute on multiple servers of a cloud environment, including the server (112). In one embodiment, the server application (115) hosts websites and generates questions (e.g., the question (129), further described below) based on a churn risk (e.g., the churn risk (124), further described below). The websites hosted by the server application (115) may serve the structured documents (142), which comprise the forms (143) and the fields (144). The server application (115) includes the risk controller (122), the field controller (125), the question controller (128) and the machine learning models (130).

The risk controller (122) is a set of hardware and software components of the server application (115). The risk controller (122) receives the user interaction data (121) and generates the churn risk (124) using the churn model (131).

The user interaction data (121) includes inputs from a user (also referred to as user input) received by the system (e.g., received by the server (112) from the client device A (102)), data for an interactive session, etc. The user input includes voice inputs, mouse inputs, keyboard inputs, etc. The user input may include a response to a question asked by the system (100). The data for an interactive session may include the duration of a session with a user, the number of completed fields, the number of remaining fields, the percentage of correctly predicted field values, etc.

In one embodiment, the user interaction data (121) identifies the user interaction of a session. The user interaction data (121) may include values for a number of times a user selected to go back, a number of times a user selected to go forward, a number of times a user selected to view a help file, a number of times a user selected to request help, a number of times a user selected to request a human agent, a number of times a user responded negatively to the system, a number of times a user modified a predicted answer by the system, etc. A negative response may include an instance when a user gets frustrated and swears in a response captured by the system (100).

The churn risk (124) identifies the risk that a user will disengage from the system (100). In one embodiment, the churn risk (124) may be a real number between the values 0 (indicating a low risk of churn or disengagement) and 1 (indicating a high risk of churn). A user may disengage from the system (100) by disconnecting from the server (112), not responding to a session, closing a session, restarting a session, etc. To disconnect from the system, a user may close a client application (e.g., the client application A (105)). A session is a temporary and interactive information interchange between two or more communicating devices, e.g., between the client devices A (102) through N (109) and the server (112). A session may be closed by closing a client application (e.g., the client applications A (105) through N (110)). When a user has not responded for a specific period of time (e.g., 30 minutes), the server (112) may close the connection due to non-responsiveness.

The risk controller (122) generates the churn risk (124) using the user interaction data (121) and the churn model (131). The risk controller (122) may combine the user interaction data (121) with additional data to generate an input vector for the churn model (131).

The field controller (125) is a set of hardware and software components of the server application (115). The field controller (125) identifies the field (127) (from the fields (144)) using the churn risk (124) and generates a prediction value for the field (127). The field controller (125) may also use the field value models (132), described further below, to identify the field (127).

The field (127) is one of the fields (144). The field (127) is the next field for which the system (100) will gather a response from a user. The field (127) is a field of data for one of the forms (143).

The question controller (128) is a set of hardware and software components of the server application (115). The question controller (128) generates the question (129) using the field (127) and a prediction value for the field (127). When the field (127) is one of a specified number of values (e.g., "married" or "single"), the question controller (128) may select one of the question phrases (147), based on a prediction value for the field (127), to use as the basis for the question (129). When the field (127) is one of an unspecified number of values (e.g., number of dependents), the question controller (128) may use one of the question templates (147) with the prediction value for the field (127) to generate the question (129).

The question (129) is garneted by the question controller (128) using the field (127) and a prediction value for the field (127). The question (129) may be a "yes question" that is phrased to elicit a positive response (e.g., a "yes") from a user of the system (100). For example, the question (129) may be "Are you married?" when the field (127) corresponds to a "filing status" and a prediction value for the field (127) predicts that the user will file as "married filing jointly".

The machine learning models (130) are hardware and software components of the server application (115). In one embodiment, the machine learning models (130) include neural networks, which may include fully connected layers, convolutional layers, recurrent layers, etc. The machine learning models (130) include the churn model (131) and the field value models (132), which are described further below with FIG. 1B.

The training application (135) is a collection of programs that may execute on multiple servers of a cloud environment, including the server (112). The training application (135) trains the machine learning models (130), which is described further below.

The repository (140) is a computing system that may include multiple computing devices in accordance with the computing system (500) and the nodes (522) and (524) described below in FIGS. 5A and 5B. The repository (140) may be hosted by a cloud services provider that also hosts the server (112). The cloud services provider may provide hosting, virtualization, and data storage services as well as other cloud services and to operate and control the data, programs, and applications that store and retrieve data from the repository (140). The data in the repository (140) includes the structured documents (142), the forms (143), the fields (144), the question templates (146), the question phrases (147), the training data (149), etc.

The structured documents (142) are electronic files that store data. The structured documents (142) use a structured document language, which may be a markup language e.g., XML (extensible markup language), JSON (JavaScript object model), YAML ("YAML Ain't Markup Language"), etc.

In one embodiment, the structured documents (142) include tree-like structures with elements that encode the data within the structured documents (142). Each element may have several properties and values that store information and represent the fields (144) of forms (143). For example, a structured document may represent a tax form with an element representing a field in the tax form.

The forms (143) are electronic documents that contain the fields (144). Each form may be stored as one or more of the structured documents (142).

The fields (144) represent the information for the forms (143). Each field may correspond to an element of one of the structure documents (142). A set of fields (of the fields (144)) for a form (of the forms (143)) may have an order that defines the sequence used for selecting a "next" field from the set of fields based on a churn risk (e.g., the churn risk (124)). For example, when a churn risk is low, the system (100) may use the order to select the next field.

The question templates (146) include strings that form the basis of questions that are generated by the system (100) and presented to the user. Each question template may correspond to one of the fields (144). For example, the question templates (146) may include a question template with the string "Do you have %NUMBER% children?". The term "%NUMBER%" is replaced with a prediction value to generate the question "Do you have 2 children?".

The question phrases (147) include strings that form the basis of questions that are generated by the system (100) and presented to the user. A set of question phrases may correspond to one of the fields (144). For example, the question phrases (147) may include a set with the question phrases of "Are you married?" and "Are you single?". The question phrase that is selected from the set may be based on the prediction value. The question phrase "Are you married?" may be selected when the prediction value predicts that the user is married and the question phrase "Are you single?" may be selected when the prediction value predicts that the user is single.

The training data (149) is the data used to train the machine learning models (130). The training data (149) may include historical records of user interactions with the system (100).

Turning to FIG. 1B the server application (115) uses the churn model (131) and the field value models (132) optimize questions to retain engagement. The server application (115) includes the risk controller (122) and the field controller (125).

The risk controller (122) uses the churn model (131) to generate the churn risk (124) from the input vector A (155). The risk controller (122) gathers user interaction data (e.g., the user interaction data (121) of FIG. 1A) and preprocesses the user interaction data to form the input vector A (155). The information in the user interaction data that is gathered includes user input and additional data. The additional data may include an interaction history, the number of fields completed, the number fields remaining, the total number of fields, the number of correct predictions, the number of incorrect predictions, the total number of predictions, a list of completed fields, a list of remaining fields, the time taken to receive a response, etc. In one embodiment, the interaction history may include titles of web pages visited by a user. Percentages may be generated from the additional data (e.g., percent of correct predictions) and used as part of the input vector to the churn model (131). The risk controller (122) inputs the input vector A (155) made from the user interaction data to the churn model (131). The input vector A (155) is a set of elements that may each include a value and represent a type of information. For example, one element may represent the duration of a current session (e.g., a floating point value measured in seconds), another element may represent the percentage of successful predictions during the current session, etc.

The churn model (131) is a machine learning model that generates the churn risk (124) form the input vector A (155). In one embodiment, the churn model (131) is a neural network, which may include fully connected layers, convolutional layers, recurrent layers, etc. As described above, the churn risk (124) is a prediction that identifies the risk that a user will disengage the system (of FIG. 1A).

The field controller (125) uses the field value models (132) to generate the prediction values (165) and the prediction confidences (168) from the input vectors B (160). Each of the different types of fields (144) (of FIG. 1A) may correspond to one of the field value models (132). During a session with a user, the field controller (125) may identify the remaining fields, of the fields (144) (of FIG. 1A), that have not been completed (i.e., "filled in"). The field controller (125) identifies the field value models (132) that correspond to the remaining fields and generates the input vectors B (160) for the field value models (132). An input vector, of the input vectors B (160), includes data structured for a corresponding field value model, of the field value models (132). A field value model, of the field value models (132), may generate a prediction value (of the prediction values (165)), a prediction confidence (of the prediction confidences (168)), or combinations thereof.

The field value models (132) are machine learning models that generate the prediction values (165) and the prediction confidences (168) from the input vectors B (160). Different algorithms may be used for the different ones of the field value models (132). In one embodiment, the field value models (132) may each include a neural network, which may include fully connected layers, convolutional layers, recurrent layers, etc. As described above, the prediction values (165) are predictions of the values of fields that have not been completed (e.g., fields for which a response has not been received from a user) and the prediction confidences (168) identify the likelihoods that the prediction values (165) are correct.

The field controller (125) selects a prediction confidence (of the prediction confidences (168)) satisfying a criterion to identify the next field (e.g., the field (127) of FIG. 1A). As an example, the criterion may be to identify the prediction value with the highest value.

Turning to FIG. 1C, the training application (135) trains the churn model (131) and the field value models (132). Each of the machine learning models (the churn model (131) and the field value models (132)) may be trained independently using supervised or unsupervised training.

During training, the churn model (131) receives a training vector generated from the training data A (175) and generates the churn risk (177) (which may also be referred to as a training churn risk). The churn model (131) may include weights and parameters that are applied to the training vectors input to the churn model (131) to calculate the training churn risks (including the churn risk (177)).

The training data A (175) is a subset of the training data (149) (of FIG. 1A) that includes data for training the churn model (131). The training data A (175) may include raw data gathered by the system from previous interactions with users and may include the vectors generated from the previous interactions and input to the churn model (131).

The update function A (178) updates the weights and parameters of the churn model (131) based on the churn risk (177). In one embodiment, the update function A (178) may use backpropagation to update the weights and parameters of the churn model (131) after comparing the churn risk (177) to a label from the training data A (175) that corresponds to the input vector from which the churn risk (177) was generated.

During training, the field value models (132) receive a training vector generated from the training data B (185) and generate the prediction values (186) (also referred to as training prediction values) and the prediction confidences (187) (also referred to as training prediction confidences). The field value models (132) may each include weights and parameters that are applied to the training vectors input to the field value models (132) to calculate the training prediction values (including the prediction values (186)) and the training prediction confidences (including the prediction confidences (187)).

The training data B (185) is a subset of the training data (149) (of FIG. 1A) that includes data for training the field value models (132). The training data B (185) may include raw data gathered by the system from previous interactions with users and may include the vectors generated from the previous interactions and input to the field value models (132).

The update functions B (188) updates the weights and parameters of the field value models (132) based on the prediction values (186) and the prediction confidences (187). In one embodiment, the update functions B (188) may use backpropagation to update the weights and parameters of the field value models (132) after comparing the prediction values (186) and the prediction confidences (187) to labels from the training data B (185) that corresponds to the input vector from which the prediction values (186) and the prediction confidences (187) were generated.

Figure 2:
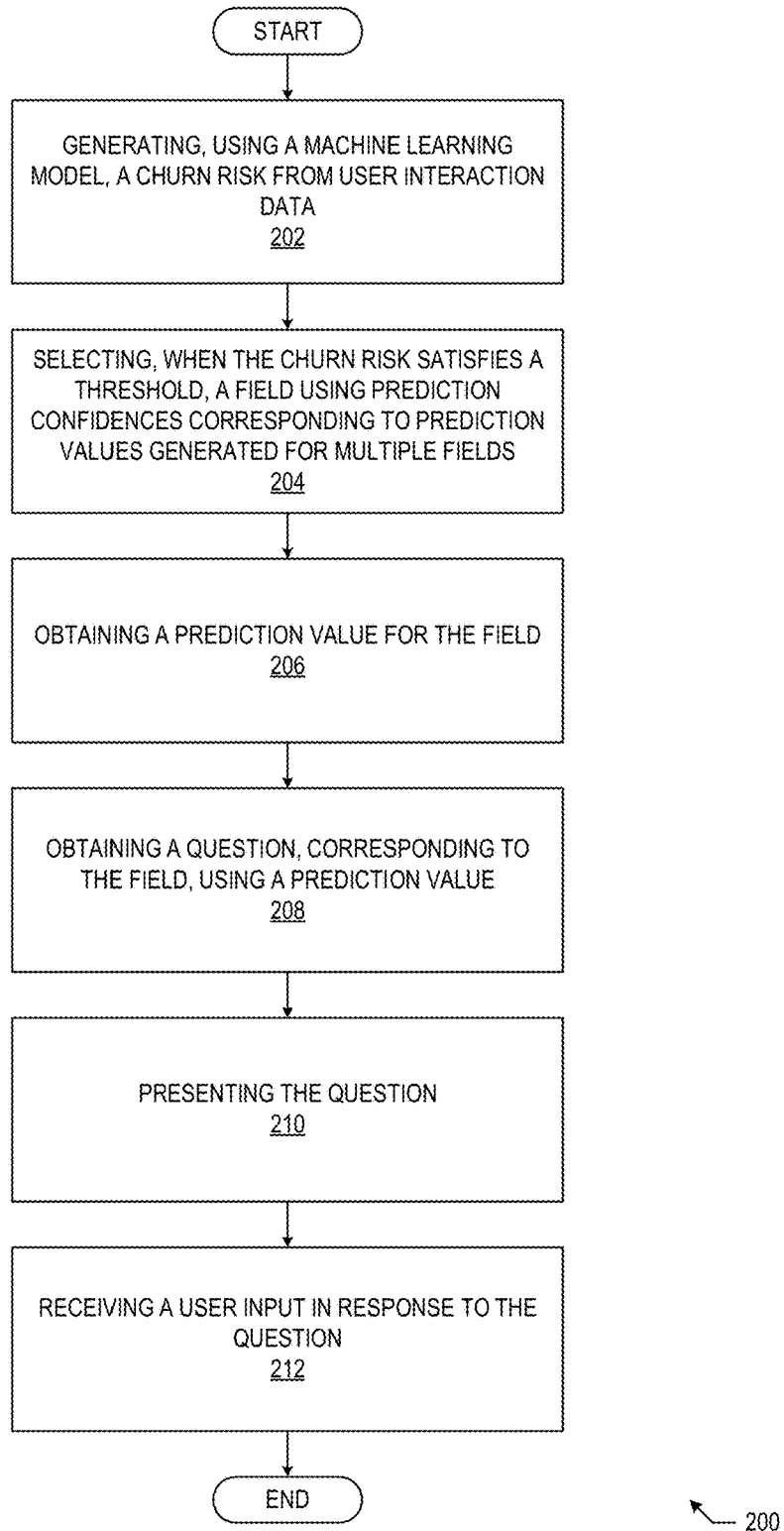
FIG. 2 shows a flowchart in accordance with disclosed embodiments.

FIG. 2 shows a flowchart of a process in accordance with the disclosure. FIG. 2 illustrates the process (200) to optimize questions to retain engagement. The embodiments of FIG. 2 may be combined and may include or be included within the features and embodiments described in the other figures of the application. The features of FIG. 2 are, individually and as an ordered combination, improvements to user response and machine learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) optimizes questions to retain engagement. The process (200) may execute as part of a server application.

At Step 202, the process (200) generates, using a machine learning model, a churn risk from user interaction data. The machine learning model may be a churn risk model that is trained to identify the risk that a user will disengage from a session (e.g., by closing a browser application). The user interaction data may include voice, mouse, and keyboard inputs from a user as well as a browser history, a value representing the number of correctly predicted responses, the duration of the session, the number of completed questions, the number of remaining questions, etc. In one embodiment, a churn risk may be generated during a session of user interaction and calculated after each response to a question is received from a user. In one embodiment, the user interaction data identifies the user interaction of a session and may include values for a number of times a user selected to go back, a number of times a user selected to go forward, a number of times a user selected to view a help file, a number of times a user selected to request help, a number of times a user selected to request a human agent, a number of times a user responded negatively to the system, a number of times a user modified a predicted answer by the system, etc. In one embodiment, the churn risk identifies a likelihood of continuing a session between a user and the system (e.g., between a client device operated by the user and a server).

In one embodiment, a predicted answer is the answer predicted by the system to a question presented to the user. The question is generated based on a prediction value that corresponds to the predicted answer. The predicted answer may be binary (e.g., yes or no) or numerical based on the question. When an answer provided by a user does not correspond to the prediction value (i.e., to the predicted answer), the system records the answer and may record that the predicted answer was not correct.

At Step 204, the process (200) selects, when the churn risk satisfies a threshold, one of multiple fields of data, using prediction confidences corresponding to prediction values generated for fields. A form includes multiple fields. During the session that the user is interacting with the system, the fields get completed by receiving responses from the user and saving data from the response as a value for the field. When the churn risk is high (e.g., above a threshold of 0.5 or 50%) and the user may be about to disengage, the system identifies the remaining fields (i.e., the fields that have not been completed). The system generates prediction values that predict the values for the remaining fields that the system expects to receive in responses from the user. The system also generates prediction confidences where a prediction confidence identifies the likelihood that a prediction value is correct and will be received in a response from the user.

The prediction values and prediction confidences are generated by machine learning models (referred to as field value models)) trained to generate the prediction values and prediction confidences for corresponding fields. As an example, a field value model for the field of marital status may be a neural network that takes an input vector and generates an output vector that identifies the predicted marital status (a prediction value) of the user. The same model (or a different model) may generate a prediction confidence for the prediction value for the marital status of the user. The field value models may be trained using historical data to generate prediction values and confidences that are compared to labels with the comparisons being used to iteratively update the models.

In one embodiment, a remaining field is selected when a prediction confidence for the prediction value for the field satisfies a criterion. For example, the field with the highest prediction confidence may be selected as the "next" field for which the system will generate a question to present to the user.

In one embodiment, a remaining field is selected as the next field using the order of the fields. The order defines the sequence to use to complete the fields by asking questions to the user. When the churn risk is low, the system uses the order of the fields to select the next field to use to ask a question of the user.

In one embodiment, the prediction value is a value predicted to be stored for a field in response to a user input. In one embodiment, the prediction confidence is a probability that a prediction value is correct.

In one embodiment, a structured document is received by the system that includes a set of fields for a form. The structured document may be structured in accordance a standard including one or more of JSON (JavaScript object model), YAML ("YAML Ain't Markup Language"), XML (extensible markup language), etc. The structured document may be presented to a client device and displayed as a form on the client device. In one embodiment, the form may be a tax form.

At Step 206, the process (200) obtains a prediction value for the field that was selected. When the churn risk does not satisfy a threshold (e.g., is below a threshold of 0.5 or 50%), the prediction value may be obtained by generating the prediction value for the field with a machine learning model for the field. When the churn risk does satisfy the threshold (e.g., is at or above a threshold of 0.5 or 50%), the prediction value may be obtained by retrieving the prediction value from the plurality of prediction values generated for the multiple fields that have not been completed.

At Step 208, the process (200) obtains a question, corresponding to the field, using a prediction value. For different fields, the number of possible values that may be used to complete the field may be specified or unspecified. For example, with marital status, the possible values may be specified as "married" or "single". As another example, for the number of dependents, the possible values may be unspecified since a user may have any number of dependents.

In one embodiment, when the field has a specified number of possible values, the question is obtained by selecting the question from multiple question phrases. Each question phrase may correspond to one of the specified number of possible values for the field selected by the system and the question phrase selected may be based on the prediction value for the field.

In one embodiment, the question is obtained by updating a question template, corresponding to the question, using the prediction value. The template may be a question phrase that includes a portion to be updated with the prediction value.

At Step 210, the process (200) presents the question. In one embodiment, the question is presented by the server transmitting the question to a client device, which displays the question to the user.

At Step 212, the process (200) receives a user input in response to the question. The user input may be a voice input, mouse input, keyboard input, etc., which may be converted to a string or numeric value by the system. The system may store the response with the selected field and identify the field as completed. The response may match the prediction value. In one embodiment, the session with the user may continue in response to the user input.

Figure 3:
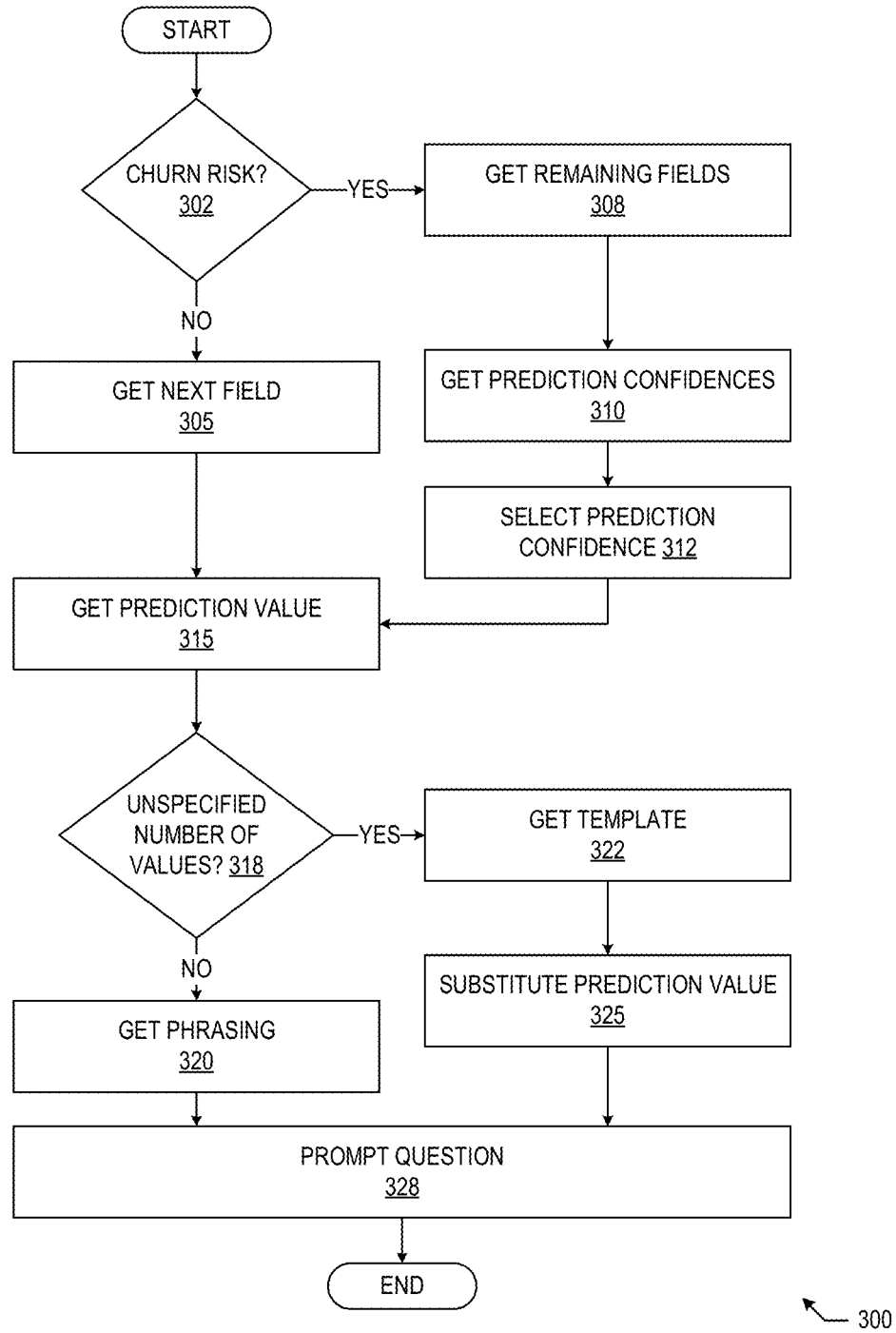
Figure 4A:
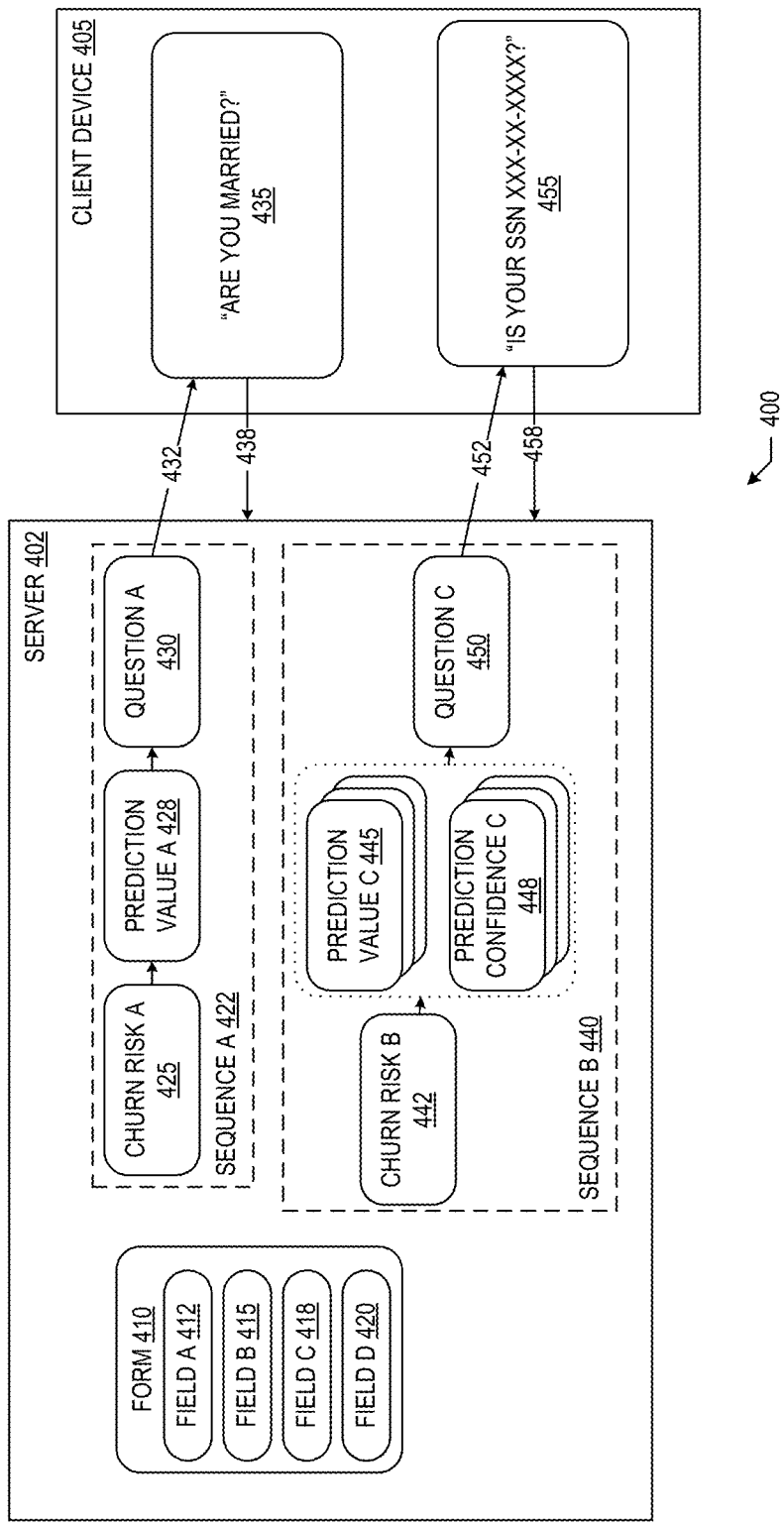
Figure 4B:
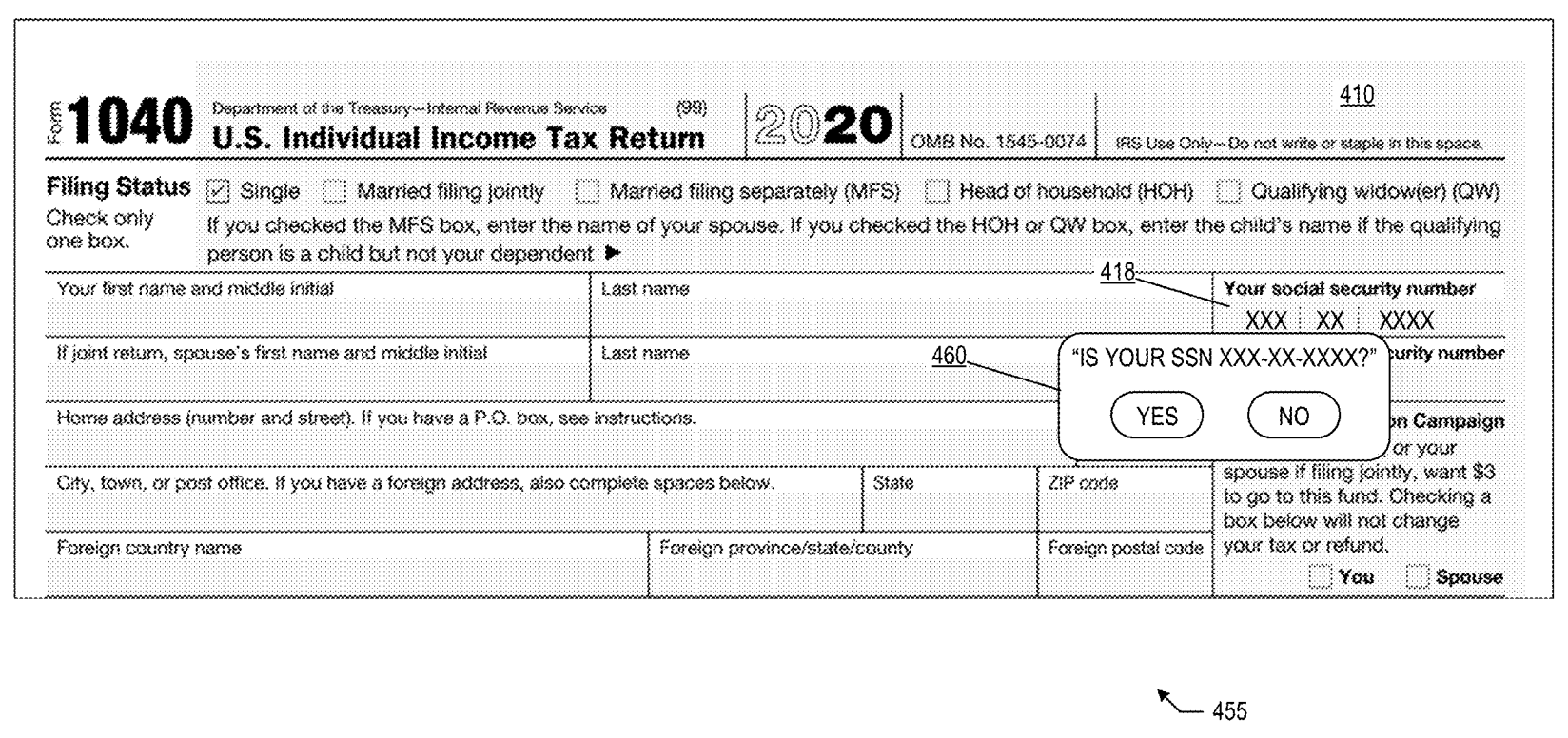

FIGS. 3, 4A, and 4B show examples in accordance with the disclosure. FIG. 3 shows an example of a process for optimizing questions. FIG. 4A shows an example of a system presenting optimized questions. FIG. 4B shows an example of a form being filled out using optimized questions. The embodiments shown in FIGS. 3, 4A, and 4B may be combined and may include or be included within the features and embodiments described in the other figures of the application. The features and elements of FIGS. 3, 4A, and 4B are, individually and as a combination, improvements to user response and machine learning technology and computing systems. The various features, elements, widgets, components, and interfaces shown in FIGS. 3, 4A, and 4B may be omitted, repeated, combined, and/or altered as shown. Accordingly, the scope of the present disclosure should not be considered limited to the specific arrangements shown in FIGS. 3, 4A, and 4B.

Turning to FIG. 3, the process (300) generates questions based on churn risk and whether a field has a specified number of possible values. The process (300) may be performed by a server application. The process (300) selects the next field for which the generate a question with the Steps 302 through 308 and then generates the question for the field with the Steps 318 through 328.

At Step 302, a churn risk is compared to a threshold. When the churn risk satisfies the threshold, the process (300) continues to Step 308. Otherwise, the process (300) continues to Step 305.

At Step 305, the next field (referred to as the selected field) of a form is selected when the churn risk does not satisfy the threshold. The next field is the field specified by an order of the data fields for the form. In one embodiment, each field of a form specifies a "next field". In one embodiment, the firm includes a list of the fields that specifies the order of the fields.

At Step 308, the remaining fields are identified when the churn risk satisfies the threshold. The remaining fields are the fields that have not been completed. The system may track the completion of fields with a list.

At Step 310, prediction confidences are generated. The system may generate both prediction values and corresponding prediction confidences for the remaining fields using machine learning models.

At Step 312, a prediction confidence is selected. The prediction confidence may be selected using a criterion. For example, the criterion may specify that the prediction confidence with the highest value from the set of prediction confidences for the remaining fields is selected. The highest prediction confidence is selected and used to identify the remaining field for which to generate a question.

At Step 315, a prediction value is obtained. When the churn risk did not satisfy the threshold (at Step (302)), the prediction value is obtained by generating the prediction value with a field value model (a machine learning model) for the remaining field selected and identified as the "next" field (referred to as the selected field). When the churn risk satisfied the threshold (at Step (302)), the prediction value is obtained by retrieving the prediction value that was generated for the remaining field having the highest prediction confidence.

At Step 318, whether the number of possible values for the selected field is unspecified is determined. When the number of possible values is unspecified, then the process (300) proceeds to Step 322. Otherwise, the process (300) proceeds to Step 320.

At Step 320, phrasing for a question is retrieved. When the number of values is specified, the prediction value is used to select one of a number of phrasings for the question to be asked of a user for the selected field. For example, for a marital status field, the number of answers may be specified as "married" or "single" and phrases (one of which is to be selected) may include "Are you married?" and "Are you single?". The prediction value may correspond to "married" and the system may select the question "Are you married?", which is phrased as a "yes" question to which the user is expected to answer "yes".

At Step 322, a template for a question is retrieved. When the number of values is unspecified, a question template defined for the selected field is retrieved.

At Step 325, the prediction value is substituted. In one embodiment, the question template, retrieved for the selected field, includes a portion into which the prediction value may be substituted. For example, the question template for a number of dependents field may include the template "Do you have %NUMBER% children?" in which the term "%NUMBER%" is substituted with the prediction value to generate the question "Do you have 2 children?", which is also a "yes" question.

At Step 328, the question is prompted. The question is prompted by transmitting the question to the client device of the user, which displays the question.

Turning to FIG. 4A, the system (400) optimizes questions presented to a user. The server (402) presents questions, to the client device (405), that are generated from the fields A (412), B (415), C (418), and D (420) of the form (410). The form (410) is a tax form that is being filled out by the system (100).

The sequence A (422) is initiated after the user operates the client device (405) to create a session with the server (402). For the sequence A (422), the churn risk A (425) is generated, which is compared to a threshold and identified as low. With the churn risk A (425) being low, the order of the fields A (412) through D (420) is used to select the next field for which to generate a question to present to the user. The next field is the field A (412).

The server (402) generates the prediction value A (428) using a field value model that corresponds to the field A (412). The field A (412) records a marital status of the user and the prediction value A (428) predicts that the user will respond as being "married".

The server (402) determines that the field A (412) has a specified number of potential values. With a specified number of potential values, the server (402) selects, using the prediction value A (428), one of a number a question phrases to generate the question A (430) for the field A (412).

At (432), the question A (430) is presented to the user by transmitting the question A (430) from the server to the client device (405). The question A (430) is displayed by the client device (405) in the user interface (435) with the string "are you married?".

At (438), the user operates the client device (405) to respond to the question A (403). The session continues, since the user has not disengaged, but the user indicates that the user is not married and may be at a higher risk of disengaging if the next question shows a lack of understanding, by the system (400), of the user.

The sequence B (440) is initiated after receiving the response from the user. The server (402) generates the churn risk B (442) with the churn model that generated the churn risk A (425) in the sequence A (422). In one embodiment, the churn model, the inputs to the churn model, or both may be updated for the sequence B (440) to include the previous negative response from the sequence A (422). The churn risk B (442) is compared to the threshold and is identified as a high risk that the user may be about to disengage. With the churn risk B (442) being high, the server (402) does not use the order of the fields (A (412) through D (420)) of the form (410) to identify the next field for which to generate a question. Rather, the server (402) selects the next field based on the likelihood that the sever (402) will correctly predict the response of the user to the next question.

Specifically, the server (402) identifies the remaining fields as the fields B (415), C (418), and D (420). The server (402) generates prediction values (including the prediction value C (445)) and prediction confidences (including the prediction confidence C (448)) for the remaining fields B (415), C (418), and D (420) using multiple field value models. The prediction confidence C (448) (corresponding to the field C (418) and to the prediction value C (445)) is identified as being the highest confidence. The field C (418) stores the social security number of the user. The prediction value C (445) predicts that the social security number of the user is "XXX-XX-XXXX".

The server (402) determines that the field C (418) has an unspecified number of possible values. With an unspecified number of possible values, the server (402) retrieves a question template for the field C (412) and substitutes the prediction value C (445) into the question template to generate the question C (450).

At (452), the question C (450) is presented to the user by transmitting the question C (450) to the client device (405). The client device (405) displays the updated user interface (455), which includes the question "is your SSN XXX-XX-XXXX".

At (438), the user operates the client device (405) to respond to the question C (450). The user indicates that the social security number was correctly predicted, and the session continues.

Turning to FIG. 4B, the updated user interface (455) is illustrated. The updated user interface (455) displays the form (410) with the field A (418). The question C (450) is displayed in the pop up window (460) on top of the form (410).

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and 508)) may be locally or remotely connected to the computer processor(s) (502), non-persistent storage (504), and persistent storage (506). Many different types of computing systems exist, and the aforementioned input and output device(s) (510 and 508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
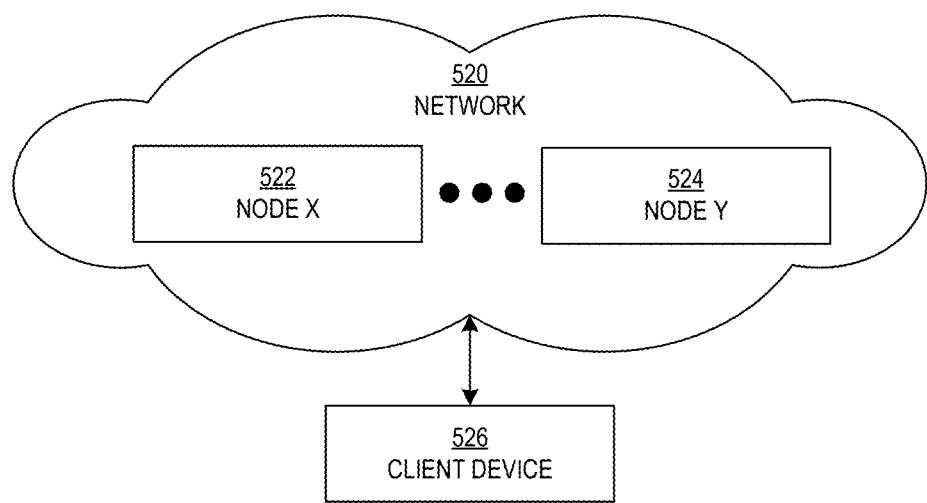

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining user interaction data from which to generate a churn risk, wherein the user interaction data identifies a user interaction of a session and comprises values for one or more of:
a first number of times a user selected to go back, a second number of times the user selected to go forward, a third number of times the user selected to view a help file, a fourth number of times the user selected to request help, a fifth number of times the user selected to request a human agent, a sixth number of times the user responded negatively to a system, and a seventh number of times the user modified a predicted answer;
generating, using a machine learning model, the churn risk from the user interaction data;
receiving a structured document comprising a plurality of fields, wherein the structured document is stored as a structured language data object in a non-transitory computer readable storage medium;

selecting, when the churn risk satisfies a threshold, a field, from the plurality of fields, using a plurality of prediction confidences corresponding to a plurality of prediction values generated for the plurality of fields, wherein selecting the field comprises:

applying a plurality of machine learning models to the structured language data object to generate the plurality of prediction values and the plurality of prediction confidences for the plurality of fields, identifying a prediction confidence, of the plurality of prediction confidences, that satisfies a criterion, and identifying the field corresponding to the prediction confidence;

obtaining a prediction value, from among the plurality of prediction values, for the field;

obtaining a question, corresponding to the field, using the prediction value, wherein obtaining the question comprises:

generating the question by selecting, when the field has a specified number of possible values, the question from a plurality of question phrases stored in a data repository, generating the question by updating, when the field has an unspecified number of possible values and using the prediction value, a question template stored in the data repository; and generating the question is performed responsive to the churn risk satisfying the threshold; and presenting the question by updating a graphical user interface to display the question.

2. The method of claim 1, further comprising:
generating the churn risk during the session;
receiving a user input in response to the question; and
continuing the session in response to the user input.

3. The method of claim 1, further comprising:
selecting the field, when the churn risk does not satisfy the threshold, using an order of the plurality of fields.

4. The method of claim 1, wherein obtaining the prediction value comprises, when the churn risk does not satisfy the threshold, generating the prediction value for the field with a selected machine learning model for the field.

5. The method of claim 1, wherein obtaining the prediction value comprises, when the churn risk satisfies the threshold, retrieving the prediction value from the plurality of prediction values generated for the plurality of fields.

6. The method of claim 1, further comprising:
generating the churn risk,
wherein the churn risk identifies a likelihood of continuing the session,
wherein the prediction value is a value predicted to be stored for the field in response to a user input received in response to the question, and
wherein the prediction confidence is a probability that the prediction value is correct.

7. The method of claim 1, further comprising:
displaying, on a display device, the structured document as a form.

8. The method of claim 1, further comprising:
training the machine learning model to generate the churn risk from the user interaction data; and
training the plurality of machine learning models to generate the plurality of prediction values and the plurality of prediction confidences for the plurality of fields.

9. The method of claim 1, further comprising:
receiving a user input in response to the question, and
updating the field in the structured document by storing, in the structured document, the user input as a value for the field.

10. A system comprising:
a risk controller configured to:
obtain user interaction data from which to generate a churn risk, wherein the user interaction data identifies a user interaction of a session and comprises values for one or more of:
a first number of times a user selected to go back, a second number of times the user selected to go forward, a third number of times the user selected to view a help file, a fourth number of times the user selected to request help, a fifth number of times the user selected to request a human agent, a sixth number of times the user responded negatively to the system, and a seventh number of times the user modified a predicted answer, and
generate the churn risk;
a field controller configured to select a field from a structured document comprising a plurality of fields, wherein the structured document is stored as a structured language data object in a non-transitory computer readable storage medium;
a question controller configured to obtain a question;
a plurality of machine learning models executing on one or more servers; and
a server application executing on the one or more servers and configured for:
generating, by the risk controller using a machine learning model of the plurality of machine learning models, the churn risk from the user interaction data;
selecting, by the field controller when the churn risk satisfies a threshold, the field, from the plurality of fields, using a plurality of prediction confidences corresponding to a plurality of prediction values generated for the plurality of fields, wherein selecting the field comprises:
applying the plurality of machine learning models to the structured language data object to generate the plurality of prediction values and the plurality of prediction confidences for the plurality of fields,
identifying a prediction confidence, of the plurality of prediction confidences, that satisfies a criterion, and
identifying the field corresponding to the prediction confidence;
obtaining a prediction value for the field, from among the plurality of prediction values;
obtaining, by the question controller, the question, corresponding to the field, using the prediction value, wherein obtaining the question comprises:
generating the question by selecting, when the field has a specified number of possible values, the question from a plurality of question phrases stored in a data repository,
generating the question by updating, when the field has an unspecified number of possible values and using the prediction value, a question template stored in the data repository, and
generating the question is performed responsive to the churn risk satisfying the threshold; and
presenting the question by updating a graphical user interface to display the question.

11. The system of claim 10, further comprising:
a churn model configured to generate the churn risk, wherein the machine learning model comprises the churn model; and
the server application further configured for:
generating, by the churn model, the churn risk during the session, and
continuing the session in response to a user input received in response to the question.

12. The system of claim 10, wherein the plurality of machine learning models comprises a plurality of field value models, the system further comprising:
a churn model configured to generate the churn risk, wherein the machine learning model comprises the churn model;
a training application executing on the one or more servers and configured for:
training the churn model to generate the churn risk from the user interaction data; and
training the plurality of field value models to generate the plurality of prediction values and the plurality of prediction confidences for the plurality of fields.

13. A method comprising:
presenting a question during a session of user interaction to a user, the question selected in response to a churn risk generated by a server application configured for:
obtaining user interaction data from which to generate the churn risk, wherein the user interaction data identifies a user interaction of the session and comprises values for one or more of:
a first number of times a user selected to go back, a second number of times the user selected to go forward, a third number of times the user selected to view a help file, a fourth number of times the user selected to request help, a fifth number of times the user selected to request a human agent, a sixth number of times the user responded negatively to a system, and a seventh number of times the user modified a predicted answer,
receiving a structured document comprising a plurality of fields, wherein the structured document is stored as a structured language data object in a non-transitory computer readable storage medium,
generating, during the session and using a machine learning model, the churn risk from the user interaction data,
selecting, when the churn risk satisfies a threshold, a field, from the plurality of fields, using a plurality of prediction confidences corresponding to a plurality of prediction values generated for the plurality of fields, wherein selecting the field comprises:
applying a plurality of machine learning models to the structured language data object to generate the plurality of prediction values and the plurality of prediction confidences for the plurality of fields,
identifying a prediction confidence, of the plurality of prediction confidences, that satisfies a criterion, and
identifying the field corresponding to the prediction confidence,
obtaining a prediction value for the field, from among the plurality of prediction values, and
obtaining an additional question, corresponding to the field, using the prediction value, wherein obtaining the additional question comprises:
generating the additional question by selecting, when the field has a specified number of possible values, the additional question from a plurality of question phrases stored in a data repository,
generating the additional question by updating, when the field has an unspecified number of possible values and using the prediction value, a question template stored in the data repository; and
generating the additional question is performed responsive to the churn risk satisfying the threshold;
presenting the additional question by updating a graphical user interface to display the question to the user; and
transmitting a user input via the graphical user interface, received in response to the additional question and continuing the session, to the server application.

\* \* \* \* \*